(12) United States Patent
Patel et al.

(10) Patent No.: US 7,333,496 B1
(45) Date of Patent: Feb. 19, 2008

(54) SYSTEM AND METHOD FOR INDICATING THE PRIORITY OF VOICE OVER INTERNET PROTOCOL (VOIP) CALLS

(75) Inventors: Labhesh Patel, Mountain View, CA (US); Shantanu Sarkar, San Jose, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1209 days.

(21) Appl. No.: 10/037,006

(22) Filed: Dec. 31, 2001

(51) Int. Cl.
*H04L 12/28* (2006.01)

(52) U.S. Cl. ................... 370/395.42; 370/352

(58) Field of Classification Search ...................... None
See application file for complete search history.

(56) References Cited

U.S. PATENT DOCUMENTS

| | | | |
|---|---|---|---|
| 3,441,680 A | 4/1969 | Zebe | 179/18 |
| 5,752,191 A | 5/1998 | Fuller et al. | 455/445 |
| 5,940,479 A * | 8/1999 | Guy et al. | 379/93.01 |
| 6,275,502 B1* | 8/2001 | Arimilli | 370/468 |
| 6,570,873 B1* | 5/2003 | Isoyama et al. | 370/375 |
| 6,760,309 B1* | 7/2004 | Rochberger et al. | 370/235 |
| 6,819,652 B1* | 11/2004 | Akhtar et al. | 370/230 |
| 6,826,173 B1* | 11/2004 | Kung et al. | 370/352 |
| 6,975,621 B2* | 12/2005 | Deshpande et al. | 370/352 |
| 7,002,919 B1* | 2/2006 | El-Sayed | 370/252 |
| 7,023,802 B2* | 4/2006 | Kawahata et al. | 370/235 |
| 7,155,539 B2* | 12/2006 | Vange et al. | 709/250 |
| 2001/0053215 A1 | 12/2001 | Larger et al. | |
| 2004/0233892 A1* | 11/2004 | Roberts et al. | 370/352 |

FOREIGN PATENT DOCUMENTS

| | | |
|---|---|---|
| EP | 0 577 332 A2 | 1/1994 |
| WO | WO 94/06236 | 3/1994 |

OTHER PUBLICATIONS

International Search Report for PCT/US02/39504 mailed Apr. 15, 2003, 9 pages.

* cited by examiner

*Primary Examiner*—Phirin Sam
(74) *Attorney, Agent, or Firm*—Baker Botts L.L.P.

(57) ABSTRACT

A method for indicating the priority of a Voice Over Internet Protocol (VoIP) call includes receiving a dialed number for a connection, generating a call set up request including the dialed number, receiving a priority for the call based on user input provided contemporaneously with the dialed number, generating a priority indicator based on the priority, and transmitting the call setup request and priority indicator to a destination device.

127 Claims, 1 Drawing Sheet

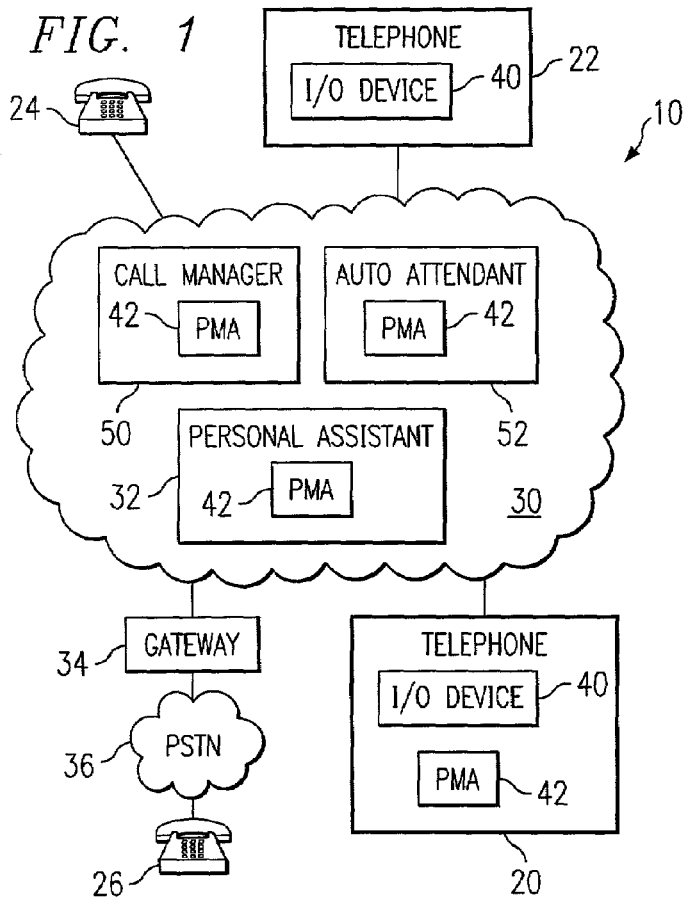
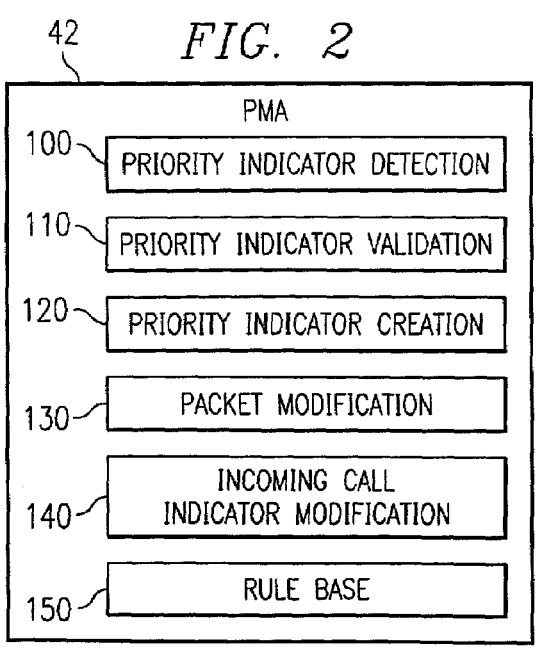
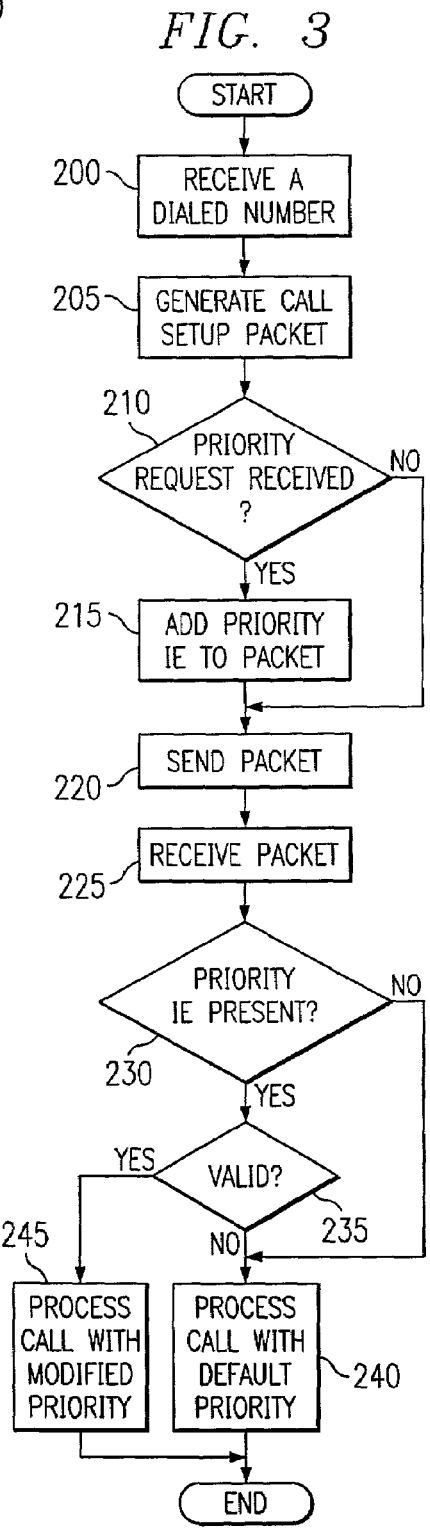

SYSTEM AND METHOD FOR INDICATING THE PRIORITY OF VOICE OVER INTERNET PROTOCOL (VOIP) CALLS

TECHNICAL FIELD OF THE INVENTION

This invention relates generally to the field of telecommunications, and more specifically to a system and method for indicating the priority of Voice Over Internet Protocol (VoIP) calls.

BACKGROUND OF THE INVENTION

Historically, telecommunications have involved a transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a Local Area Network (LAN) or a Wide Area Network (WAN).

Currently, telecommunications and data transmissions are being merged into an integrated communication network using technology such as Voice-over Internet Protocol (VoIP). Since many LANs and WANs transmit computer data using Internet Protocol (IP), VoIP uses this existing technology to transmit voice and fax signals by converting these signals into digital data and encapsulating the data for transmission over an IP network.

SUMMARY OF THE INVENTION

The present invention includes a system and method for indicating the priority of Voice Over Internet Protocol (VoIP) calls that substantially eliminates or reduces disadvantages or problems associated with previously developed systems and methods. In a particular embodiment, the present invention allows a calling party to set the priority of calls on a call-by-call basis.

In accordance with a particular embodiment of the present invention, a method for indicating the priority of a VoIP call includes receiving a dialed number for a connection, generating a call setup request including the dialed number, receiving a priority for the call based on user input provided contemporaneously with the dialed number, generating a priority indicator based on the priority, and transmitting the call setup request and priority indicator.

In accordance with another embodiment of the present invention, a method for indicating the priority of a VoIP call includes receiving a call setup request for connection to a dialed number, receiving a priority indicator for the connection based on user input provided contemporaneously with the dialed number, processing the call setup request to set up a connection, and transmitting the priority indicator to a destination device for indication to a call recipient.

In yet another embodiment of the present invention, an method for indicating the priority of a VoIP call includes establishing a connection to a dialed number with the calling party, receiving a priority indicator for the connection based on user input provided contemporaneously with the dialed number, and indicating to a call recipient the priority of the connection.

In accordance with still another embodiment of the present invention, a method for indicating the priority of a VoIP call includes receiving a call setup request for connection to a dialed number, receiving a priority indicator for the connection based on user input provided contemporaneously with the dialed number, processing the call setup request to set up a connection, accessing a rule base to validate the priority request, negating the priority indicator if determined invalid based on the rule base, and transmitting the priority indicator (if not negated) to a destination device for indication to a call recipient.

Technical advantages of the present invention include a system and method for indicating the priority of VoIP calls. In particular, a user may set and/or modify call priority on a call-by-call basis. According to one embodiment of the present invention, a user may provide input indicating that the user desires to modify the priority of the call. Moreover, a priority indicator may be generated associated with the requested priority and used to represent the requested priority of the user. An intermediary and destination device may be configured to recognize the priority indicator. Accordingly, the destination device may, based on the priority indicator, modify the ordinary incoming call signaling method to indicate to the called party that the priority of the call has been modified by the calling party.

Additional technical advantages include: allowing users to alert a called party of an urgent incoming call; enhancing an auto-attendant by allowing a caller to indicate that a call is urgent; enhancing a personal assistant (PA) by allowing a caller to indicate that a call is urgent; allowing a caller to record a real-time uttered phrase to indicate call priority; and providing a called party with either an audible or a visual indication regarding the priority of a specific call.

It will be understood that various embodiments of the present invention may have some, none, or all of the above and elsewhere described technical advantages. In addition, other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following descriptions, taken in conjunction with the accompanying drawings, in which:

FIG. 1 illustrates a communications network in accordance with a particular embodiment of the present invention;

FIG. 2 illustrates details of the priority modification agent of FIG. 1 in accordance with one embodiment of the present invention; and FIG. 3 illustrates a method for indicating the priority of Voice Over Internet Protocol (VoIP) calls in accordance with one embodiment of the present invention.

DETAILED DESCRIPTION OF THE INVENTION

FIG. 1 illustrates a communications network 10 in accordance with one embodiment of the present invention. Although a specific communications network is illustrated in FIG. 1, the term "communications network" should be interpreted as generically defining any network capable of transmitting telecommunication signals, data, and/or messages. In the illustrated embodiment, network 10 includes a plurality of terminal units 20, 22, 24, and 26. Terminal units 20, 22, 24, and 26 are coupled to communications network 30. Terminal units 20, 22, and 24 may include telephones, personal digital assistants, computers, or any other wire-line or wireless devices capable of communicating voice or other suitable information over a distributed network. For simplicity, and in a non-limiting manner, terminal devices 20, 22, 24, and 26 are shown as telephones capable of connecting with a Voice Over Internet Protocol (VoIP) system. Likewise, terminal device 26 is shown as a telephone capable of connecting to a Public Switched Telephone Network (PSTN).

Communications network 30 may include any computer and/or communication network including, but not limited to, the internet, intranets, local area networks (LANs), wide area networks (WANS), or metropolitan area networks (MANs). Routers and other elements of communications network 30 may be connected by twisted pair, cable, optical fiber or other suitable wire-line links and/or radio frequency, microwave, infrared, or other suitable wireless links.

Terminal devices 20, 22, 24, and 26 may be coupled to communications network 30 in a variety of ways. For example, terminal device 20 may be coupled directly to communications network 30. Personal assistant 32, in collaboration with call manager 50, may automatically dial numbers, respond to voice-activated information, establish connections over communications network 30, screen calls, block or reroute calls, and other suitable services. It will be understood that the functionality and/or components of personal assistant 32 may instead be located in terminal devices and/or edge or access routers and/or other suitable devices of communications network 30. In still another embodiment, as illustrated by terminal device 26, terminal devices may be connected to communications network 30 via a gateway 34 to connect to a Public Switched Telephone Network (PSTN) 36.

Terminal device 20 may include an input/output device 40 and, in the illustrated embodiment, a priority modification agent (PMA) 42. In another embodiment, personal assistant 32 may include PMA 42. In an alternative embodiment, a call manager 50 and/or auto attendant 52 may include PMA 42. In yet another alternative embodiment, gateway 34 may include PMA 42 and may perform the functionality of PMA 42 for terminal device 26.

Input/output device 40 may include various input/output devices such as light emitting diode (LED) displays, liquid crystal display (LCD) or other suitable displays, microphones, speakers, soft keys, hard keys, or other suitable input/output devices.

As discussed in more detail below, a calling party may indicate call priority on a call-by-call basis based on user input. The user input may be by any of the various input/output devices such as, for example, a voice input, a dedicated soft or hard key, a numeric prefix or suffix to a dialed number, or other suitable means. The priority may be indicated to the called party by a variety of means, such as a flashing light, sound, unique ring tone, spoken phrase, or other suitable methods. The call priority may be high, low, normal, urgent, routine, or other suitable priorities appropriate to the network. As used herein, the term "call" means any suitable voice or other connection.

In the ordinary VoIP environment, an exemplary call may be illustrated by FIG. 1. A user operating terminal device 20 dials a number via input/output device 40 indicating a specific destination terminal device. In the illustrated embodiment, the user may wish to communicate, for example, with terminal device 22. Accordingly, terminal device 20 generates an information packet to be sent over communications network 30 requesting a connection with terminal device 22. In some embodiments, call manager 50 would establish a connection between terminal unit 20 and terminal unit 22 across communications network 30. Alternatively, terminal unit 20 may establish a connection directly with terminal unit 22 across communications network 30. Or, terminal unit 20 may establish a connection with terminal unit 22 across network 30, facilitated by personal assistant 32. In still another exemplary embodiment, auto attendant 52 may facilitate establishment of a connection between terminal unit 20 and terminal unit 22, usually in the event that the user at terminal unit 22 is non-responsive to requests to initiate a connection.

In each of these exemplary embodiments, and as will be discussed in connection with FIGS. 2 and 3, the calling party may specify a priority for the call and the priority modification agent (PMA) 42 may operate to enable the user at terminal unit 20, 22, 24, and 26 to indicate the priority of the requested connection. The calling party may specify a priority for the call on a call-by-call basis, independent of other criteria such as, for example, the calling party identification, time of day, or called party identification. Moreover, the calling party may specify a priority for the call contemporaneously with the dialed number. As used herein, "contemporaneously" means any time before the called party answers the call and may be before, during, or after the calling party requests the connection. Thus, a calling party may call a destination at a first priority and later call the same destination at a second, disparate priority. PMA 42 may also validate the priority indicated for the requested connection. As used herein, "valid" and "validate" mean "at least not unauthorized" and "to ensure that something is at least not unauthorized."

FIG. 2 is a block diagram illustrating details of priority modification agent (PMA) 42 in accordance with one embodiment of the present invention. PMA 42 includes various components operable to perform the associated tasks of PMA 42 in accordance with one embodiment of the present invention. PMA 42 includes priority indicator detection module 100, priority indicator validation module 110, priority indicator creation module 120, packet modification module 130, incoming call indicator modification module 140, and rule base 150. Although PMA 42 is described with certain components, various components may be omitted or added as desired to function within a particular communications network. Furthermore, various components may be located within different PMAs 42, as desired to meet the needs of a particular communications network, and the functionality may be otherwise distributed.

Each of the modules of PMA 42, as well as the functionality of other network components, may comprise logic encoded in media. The logic comprises functional instructions for carrying out programmed tasks. The media comprises computer disks or other suitable computer-readable media, application specific integrated circuits (ASIC), field programmable gate arrays (FPGA), digital signal processors (DSP) or other suitable specific or general purpose processors, transmission media or other suitable media in which logic may be encoded and utilized. In this instance and throughout this application, the term "each" includes all of a particular subset. Priority indicator detection module 100 is operable to detect and identify priority indicators passed to or otherwise received by PMA 42. Priority indicator validation module 110 is operable to access rule base 150 to verify the validity or authority of the priority of a VoIP call.

Priority indicator creation module 120 is operable to create a priority indicator at the request of a user as provided by the user to PMA 42. Packet modification module 130 is operable to modify a VoIP packet to include the priority indicator generated by the priority indicator creation module 120. Packet modification module 130 is also operable to strip a VoIP packet of a priority indicator in the event that priority indicator validation module 110 determines that the priority indicator is not valid, or modify the priority indicated as determined by rule base 150. In a specific embodiment, packet modification module 130 inserts a priority packet in the call setup sequence rather than modifying an existing packet. Incoming call indicator modification module 140 is operable to modify the method or mode by which a user of a terminal device is alerted to an incoming call or a request from another terminal user to establish a connection. Incoming call indicator modification module 140 is therefore operable to provide a plurality of indication mechanisms. Example indication mechanisms include, but are not limited to, a distinctive ring, flashing light, spoken phrase, or other suitable indicators.

Ordinarily, incoming call indicator modification module 140 is only necessary when PMA 42 is a component of a terminal unit, as illustrated by terminal unit 20 of FIG. 1 or an endpoint such as gateway 34. In the event that PMA 42 is instead associated with, for example, call manager 50, auto attendant 52, or personal assistant 32, the incoming call indicator modification module 140 may not be necessary and may instead be located separately on another terminal unit such as, for example, terminal unit 22 of FIG. 1.

Rule base 150 is operable to maintain a table or database or other suitable structures containing information regarding the validity of priority indicators. Rule base 150 may be organized by the telephone number associated with the dialing terminal unit, the telephone number associated with the recipient or called unit, a combination of the two, a statistical analysis of the calling patterns across the network or from the dialed or called unit, or otherwise configured in accordance with the network configurations and requirements. Operation of PMA 42 and rule base 150 will become more apparent through reference to FIG. 3.

FIG. 3 illustrates a method for indicating the priority of VoIP calls in accordance with one embodiment of the present invention. The method begins at step 200 in which a dialed number is received. Step 200 may be performed by a terminal unit, such as terminal unit 20 of FIG. 1, receiving input from a user, but other components of network 30 may perform this step, as necessary. The user may input a priority request through either a prefix to a dialed number, a suffix to a dialed number, a separate button provided for the purpose of modifying the priority of a call, or in response to a prompt by, for example, the auto attendant 52 of FIG. 1. Similarly, distributed VoIP systems that utilize either SIP or H.323 may augment these protocols by adding a private extension to the protocol to indicate the priority of the call. In other embodiments the user may indicate that the priority of the call is to be modified in any way suitable to communicate to the VoIP network the desired priority. In a particular embodiment, a user may record a spoken phrase for delivery to the destination terminal unit. The spoken phrase may be recorded in real-time and may include such phrases as "please answer," "this is urgent," or other suitable phrase chosen by the user. The spoken phrase may then be transmitted to the destination terminal unit in a manner similar to that used to process the priority information element (IE).

At step 205, a call setup request is generated. The request may be a fixed- or variable-length packet, data bit, or other suitable tool configured for use in the particular network. This step is ordinarily performed by a terminal unit in response to the dialed number received at step 200 but other components of network 30 may perform this step, as necessary.

Proceeding to decisional step 210, the method branches depending on whether a priority request was also received. If the user operating terminal unit 20 did not send a priority request or a priority request was not received, the method continues along the No branch to step 220. If the terminal unit 20 has received a priority request, the method continues along the Yes branch to step 215.

At step 215, a priority information element is added to the call setup request. Where the call setup request is a fixed-length packet, the information element may be a field already existent in the packet in which the priority information element is simply modified. Where the call setup request is a variable-length packet, the information element may be appended to the packet as either a prefix or a suffix, in accordance with the configuration of the particular network. In another embodiment, a priority packet is added to the call setup protocol and message exchange. Step 215 may be performed by the priority modification agent 42 of FIGS. 1 and 2, but other components of network 30 may perform this step, as necessary.

The process continues at step 220 where the call setup request is then sent to another component of the network for processing and call setup. The call setup request is sent with or without a priority information element as determined at decisional step 210. Step 220 may be performed by terminal device 20, but other components of network 30 may perform this step, as necessary.

Next, at step 225 the call setup request is received. The call setup request may be received by the priority modification agent 42 associated with a call manager 50, auto attendant 52, or personal assistant 32, or terminal device 22 of FIG. 1, depending on the particular configuration of the network, but other components of network 30 may perform this step, as necessary. Priority modification agent (PMA) 42, wherever embodied, receives the call setup request at step 225.

At decisional step 230, the call setup request is examined for a priority information element. Step 230 may be performed by the priority modification agent 42 of FIG. 1, but other components of network 30 may perform this step, as necessary. If the priority information element is not present, the process proceeds along the No branch to step 240 where the connection is processed with the system default priority. If a priority information element is present, the process continues along the Yes branch to decisional step 235.

At decisional step 235, the validity of the priority information element is determined. Step 235 may be performed by the priority modification agent 42, but other components of network 30 may perform this step, as necessary. As mentioned above, the priority modification agent may be associated with the recipient terminal unit 22, the personal assistant 32, a call manager 50, or an auto attendant 52. To determine validity, the priority indicator validation module 110 of PMA 42 accesses rule base 150.

As described above, rule base 150 may be based on a variety of criteria. For example, the rule base may be configured to prevent any priority modification by a particular terminal unit 20, or the rule base 150 may be configured to prevent priority modification by a particular terminal 20 only when directed towards a particular terminal unit 22. Alternatively, rule base 150 may be configured to prevent a particular terminal unit 20 from modifying the priority of a call based on the statistical characteristics of the calls made from that terminal unit 20. For example, rule base 150 may prevent priority modification by any terminal unit that modifies the priority of greater than 15% of its calls.

Similarly, the called party may configure rule base 150 to apply Boolean logic rules to received calls based on the calling party identification, time of day, or other suitable criteria. The called party can configure callers into, for example, two categories: those whose urgent call indicator is conveyed to the called party and those whose urgent call indicator is ignored. Accordingly, rule base 150 may be configured to prevent abuse of the priority modification option or otherwise configured to meet the needs of the network and/or users.

If the priority element is found not valid, the process continues along the No branch to step 240, where the call is processed with the system default. Alternatively, the priority information element may be modified to reflect a valid or allowable priority as determined by rule base 150. Step 240 may be performed by PMA 42, in particular the packet modification module 130, but other components of network 30 may perform this step, as necessary. If at step 235 the priority information element is determined to be valid, the process continues along the Yes branch to step 245.

At step 245, the call is processed with a modified priority. In one embodiment, the network components are configured to recognize the priority IE and grant access to resources in accordance with the priority indicated by the priority IE. In another embodiment, one or more various network elements, such as call manager 50 or the terminal units, for example, may also perform steps 220 through 240/245. In some embodiments, steps 220 through 240/245 may be performed by each network component involved in establishing a connection between terminal units.

Call processing, whether modified or default priority, includes indicating the presence of an incoming call to a user of a terminal unit with the incoming call notification associated with the appropriate priority level. After the call is indicated to the user of the appropriate terminal unit, the process ends.

The modified priority may be indicated to a user in a variety of ways. For example, a distinctive ring, a flashing light, a computer generated or pre-recorded voice speaking the word "urgent," and/or a real-time uttered phrase spoken by the calling party, a display on a computer system may be employed to indicate to the user that the calling party considers this call of modified priority.

Although the steps have been described in a particular order, it will be understood that certain steps may be omitted, or additional steps added, as required by the network configuration.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for indicating a priority of a Voice Over Internet Protocol (VoIP) call, comprising:
    receiving a dialed number for a connection;
    generating a call setup request including the dialed number;
    receiving a caller-specified priority for the call based on a caller input provided contemporaneously with the dialed number, wherein the priority is independent of a call recipient;
    accessing a rule base to validate the priority;
    generating a priority indicator based on the priority;
    negating the priority indicator if determined invalid based on the rule base; and
    transmitting the call setup request and priority indicator.

2. The method of claim 1, wherein the priority indicator is an information element (IE).

3. The method of claim 2, further comprising:
    receiving an alerting phrase from a user; and
    transmitting the alerting phrase with the priority indicator.

4. The method of claim 1, wherein the priority is high.

5. The method of claim 1, wherein the priority is low.

6. The method of claim 1, wherein the caller input is received after the call setup request has been transmitted.

7. The method of claim 1, wherein the caller input is received as a prefix to the dialed number.

8. The method of claim 1, further comprising generating the priority in response to at least activation of a button on an input device by a user.

9. The method of claim 1, further comprising prompting a user for the priority with an automated system.

10. The method of claim 1, further comprising generating the priority in response to at least a spoken input sound recognized by voice recognition logic.

11. The method of claim 1, further comprising validating the priority at a calling party device.

12. The method of claim 1, further comprising validating the priority at a called party device.

13. The method of claim 1, wherein the rule base is based on statistical information gathered regarding a calling party device.

14. The method of claim 1, wherein the rule base is based on statistical information gathered regarding both calling and called parties' devices.

15. The method of claim 1, wherein the rule base is based on input provided by a user at a called party device.

16. A method for indicating a priority of a Voice Over Internet Protocol (VoIP) call, comprising:
    receiving a call setup request to a dialed number;
    receiving a caller-specified priority indicator for a connection based on a caller input provided contemporaneously with the dialed number, wherein the priority indicator is independent of a call recipient;
    processing the call setup request to set up the connection; and
    transmitting the priority indicator for delivery to a destination device for indication to the call recipient.

17. The method of claim 16, wherein the priority indicator is an information element (IE).

18. The method of claim 17, further comprising:
    receiving an alerting phrase from a user; and
    transmitting the alerting phrase with the priority indicator.

19. The method of claim 16, wherein the priority is high.

20. The method of claim 16, wherein the priority is low.

21. The method of claim 16, wherein the caller input is received after the call setup request has been processed.

22. The method of claim 16, wherein the caller input is received as a prefix to the dialed number.

23. The method of claim 16, further comprising:
    accessing a rule base to validate the priority; and
    negating the priority indicator if determined invalid based on the rule base.

24. The method of claim 23, wherein the rule base is based on statistical information gathered regarding a calling party device.

25. The method of claim 23, wherein the rule base is based on statistical information gathered regarding a combination of calling and called parties' devices.

26. The method of claim 23, wherein the rule base is based on input provided by a user at a called party device.

27. A method for indicating a priority of a Voice Over Internet Protocol (VoIP) call, comprising:
    ringing a dialed number to establish a connection with a calling party;

receiving a caller-specified priority indicator for the connection based on a caller input provided contemporaneously with the dialed number, wherein the priority indicator is independent of a call recipient;

indicating to the call recipient the priority of the connection.

28. The method of claim 27, wherein the priority indicator is an information element (IE).

29. The method of claim 28, further comprising:
receiving an alerting phrase from a user; and
transmitting the alerting phrase with the priority indicator.

30. The method of claim 27, wherein the priority is high.

31. The method of claim 27, wherein the priority is low.

32. The method of claim 27, further comprising:
accessing a rule base to validate the priority; and
indicating the priority if valid.

33. The method of claim 32, wherein the rule base is based on the statistical information gathered regarding a calling party device.

34. The method of claim 32, wherein the rule base is based on statistical information gathered regarding a combination of calling and called parties' devices.

35. The method of claim 32, wherein the rule base is based on input provided by a user at a called party device.

36. The method of claim 27, wherein the priority is indicated by a distinctive ring.

37. The method of claim 27, wherein the priority is indicated by a flashing light.

38. The method of claim 27, wherein the priority is indicated by a display on an LCD display.

39. The method of claim 27, wherein the priority is indicated by a spoken phrase.

40. The method of claim 39, wherein the spoken phrase is a pre-recorded voice file.

41. The method of claim 39, wherein the spoken phrase is a real-time uttered phrase of the calling party.

42. A system, comprising:
logic encoded in media; and,
the logic being operable to receive a dialed number for a connection; generate a call setup request including the dialed number; receive a caller-specified priority for the call based on a caller input provided contemporaneously with the dialed number, wherein the priority is independent of a call recipient; access a rule base to validate the priority; generate a priority indicator based on the priority; negate the priority indicator if determined invalid based on the rule base; and transmit the call setup request and priority indicator.

43. The system of claim 42, wherein the priority indicator is an information element (IE).

44. The system of claim 43, the logic further operable to:
receive an alerting phrase from a user; and
transmit the alerting phrase with the priority indicator.

45. The system of claim 42, wherein the priority is high.

46. The system of claim 42, wherein the priority is low.

47. The system of claim 42, wherein the caller input is received after the call setup request has been transmitted.

48. The system of claim 42, wherein the caller input is received as a prefix to the dialed number.

49. The system of claim 42, the logic further operable to generate the priority in response to at least activation of a button on an input device by a user.

50. The system of claim 42, the logic further operable to prompt a user for the priority with an automated system.

51. The system of claim 42, the logic further operable to generate the priority in response to at least a spoken input recognized by voice recognition logic.

52. The system of claim 42, the logic further operable to validate the priority at a calling party device.

53. The system of claim 42, the logic further operable to validate the priority at a called party device.

54. The system of claim 42, wherein the rule base is based on statistical information gathered regarding a calling party device.

55. The system of claim 42, wherein the rule base is based on statistical information gathered regarding a combination of calling and called parties' devices.

56. The system of claim 42, wherein the rule base is based on input provided by a user at a called party device.

57. A system, comprising:
logic encoded in media; and,
the logic being operable to receive a call setup request to a dialed number; receive a caller-specified priority indicator for a connection based on a caller input provided contemporaneously with the dialed number, wherein the priority indicator is independent of a call recipient; process the call setup request to set up the connection; and transmit the priority indicator for delivery to a destination device for indication to the call recipient.

58. The system of claim 57, wherein the priority indicator is an information element (IE).

59. The system of claim 57, the logic further operable to:
receive an alerting phrase from a user; and
transmit the alerting phrase with the priority indicator.

60. The system of claim 57, wherein a priority is high.

61. The system of claim 57, wherein a priority is low.

62. The system of claim 57, wherein the caller input is received after the call setup request has been processed.

63. The system of claim 57, wherein the caller input is received as a prefix to the dialed number.

64. The system of claim 57, the logic further operable to:
access a rule base to validate a priority;
negate the priority indicator if determined invalid based on the rule base.

65. The system of claim 64, wherein the rule base is based on statistical information gathered regarding a calling party device.

66. The system of claim 64, wherein the rule base is based on statistical information gathered regarding a combination of calling and called parties' devices.

67. The system of claim 64, wherein the rule base is based on input provided by a user at a called party device.

68. A system, comprising:
logic encoded in media; and
the logic being operable to ring a dialed number to establish a connection with a calling party; receive a caller-specified priority indicator for the connection based on a caller input provided contemporaneously with the dialed number, wherein the priority indicator is independent of a call recipient; indicate to the call recipient a priority of the connection.

69. The system of claim 68, wherein the priority indicator is an information element (IE).

70. The system of claim 69, the logic further operable to:
receive an alerting phrase from a user; and
transmit the alerting phrase with the priority indicator.

71. The system of claim 68, wherein the priority is high.

72. The system of claim 68, wherein the priority is low.

73. The system of claim 68, the logic further operable to:
access a rule base to validate the priority; and
indicate the priority if valid.

74. The system of claim 73, wherein the rule base is based on statistical information gathered regarding a calling party device.

75. The system of claim 73, wherein the rule base is based on statistical information gathered regarding a combination of calling and called parties' devices.

76. The system of claim 73, wherein the rule base is based on input provided by a user at a called party device.

77. The system of claim 73, wherein the priority is indicated by a distinctive ring.

78. The system of claim 73, wherein the priority is indicated by a flashing light.

79. The system of claim 73, wherein the priority is indicated by a display on an LCD display.

80. The system of claim 73, wherein the priority is indicated by a spoken phrase.

81. The system of claim 80, wherein the spoken phrase is a pre-recorded voice file.

82. The system of claim 80, wherein the spoken phrase is a real-time uttered phrase of a calling party.

83. A system, comprising:
a means for receiving a dialed number for a connection;
a means for generating a call setup request including the dialed number;
a means for receiving a caller-specified priority for a call based on a caller input provided contemporaneously with the dialed number, wherein the priority is independent of a call recipient;
a means for accessing a rule base to validate the priority;
a means for generating a priority indicator based on the priority;
a means for negating the priority indicator if determined invalid based on the rule base; and
a means for transmitting the call setup request and priority indicator.

84. The system of claim 83, wherein the priority indicator is an information element (IE).

85. The system of claim 83, further comprising:
a means for receiving an alerting phrase from a user; and
a means for transmitting the alerting phrase with the priority indicator.

86. The system of claim 83, wherein the priority is high.

87. The system of claim 83, wherein the caller input is received after the call setup request has been processed.

88. The system of claim 83, wherein the caller input is received as a prefix to the dialed number.

89. The system of claim 83, further comprising a means for generating the priority in response to at least activation of a button on an input device.

90. The system of claim 83, further comprising a means for prompting a user for the priority with an automated system.

91. The system of claim 83, further comprising a means for generating the priority in response to at least a spoken input recognized by voice recognition logic.

92. The system of claim 83, further comprising a means for validating the priority at a calling party device.

93. The system of claim 83, further comprising a means for validating the priority at a called party device.

94. The system of claim 83, wherein the rule base is based on statistical information gathered regarding a calling party device.

95. The system of claim 83, wherein the rule base is based on statistical information gathered regarding a combination of calling and called parties' devices.

96. The system of claim 83, wherein the rule base is based on input provided by a user at a called party device.

97. A system, comprising:
a means for receiving a call setup request to a dialed number;
a means for receiving a caller-specified priority indicator for a connection based on a caller input provided contemporaneously with the dialed number, wherein the priority indicator is independent of a call recipient;
a means for processing the call setup request to set up the connection; and
a means for transmitting the priority indicator for delivery to a destination device for indication to the call recipient.

98. The system of claim 97, wherein the priority indicator is an information element (IE).

99. The system of claim 98, further comprising:
a means for receiving an alerting phrase from a user; and
a means for transmitting the alerting phrase with the priority indicator.

100. The system of claim 97, wherein a priority is high.

101. The system of claim 97, wherein a priority is low.

102. The system of claim 97, wherein the caller input is received after the call setup request has been processed.

103. The system of claim 97, wherein the caller input is received as a prefix to the dialed number.

104. The system of claim 97, further comprising:
a means for accessing a rule base to validate the priority; and
a means for negating the priority indicator if determined invalid based on the rule base.

105. The system of claim 104, wherein the rule base is based on statistical information gathered regarding a calling party device.

106. The system of claim 104, wherein the rule base is based on statistical information gathered regarding a combination of calling and called parties' devices.

107. The system of claim 104, wherein the rule base is based on input provided by a user at a called party device.

108. A system, comprising:
a means for ringing a dialed number to establish a connection with a calling party;
a means for receiving a caller-specified priority indicator for the connection based on a caller input provided contemporaneously with the dialed number, wherein the priority indicator is independent of a call recipient;
a means for indicating to the call recipient a priority of the connection.

109. The system of claim 108, wherein the priority indicator is an information element (IE).

110. The system of claim 109, further comprising:
a means for receiving an alerting phrase from a user; and
a means for transmitting the alerting phrase with the priority indicator.

111. The system of claim 108, wherein the priority is high.

112. The system of claim 108, wherein the priority is low.

113. The system of claim 108, further comprising:
a means for accessing a rule base to validate the priority; and
a means for indicating the priority if valid.

114. The system of claim 113, wherein the rule base is based on statistical information gathered regarding a calling party device.

115. The system of claim 113, wherein the rule base is based on statistical information regarding a combination of calling and called parties' devices.

116. The system of claim 113, wherein the rule base is based on input provided by a user at a called party device.

117. The system of claim 113, wherein the priority is indicated by a distinctive ring.

118. The system of claim 113, wherein the priority is indicated by a flashing light.

119. The system of claim 113, wherein the priority is indicated by a display on an LCD display.

120. The system of claim 113, wherein the priority is indicated by a spoken phrase.

121. The system of claim 120, wherein the spoken phrase is a pre-recorded voice file.

122. The system of claim 120, wherein the spoken phrase is a real-time uttered phrase by the calling party.

123. A method for indicating a priority of Voice Over Internet Protocol (VoIP) calls, comprising:
 receiving contemporaneously with placement of a call a caller-specified priority for the call, wherein the priority is independent of a call recipient; and
 communicating the caller-specified priority as part of placement of the call for indication of the priority to the call recipient.

124. The method of claim 123, further comprising blocking indication of the priority based on input provided by the call recipient.

125. A method for indicating the priority of a Voice Over Internet Protocol (VoIP) call, comprising:
 receiving a dialed number for a connection;
 generating a call setup request including the dialed number;
 receiving a caller-specified priority for the call based on a caller input provided contemporaneously with the dialed number, wherein the priority is independent of a call recipient;
 generating a priority indicator based on the priority, wherein the priority indicator is an information element (IE);
 receiving an alerting phrase from a user; and
 transmitting the call setup request, the priority indicator, and the alerting phrase.

126. A method for indicating the priority of a Voice Over Internet Protocol (VoIP) call, comprising:
 receiving a dialed number for a connection;
 generating a call setup request including the dialed number;
 receiving a caller-specified priority for the call based on a caller input provided contemporaneously with the dialed number, wherein the priority is independent of a call recipient;
 generating the priority in response to at least activation of a button on an input device by a user;
 generating a priority indicator based on the priority; and
 transmitting the call setup request and priority indicator.

127. A method for indicating the priority of a Voice Over Internet Protocol (VoIP) call, comprising:
 receiving a dialed number for a connection;
 generating a call setup request including the dialed number;
 receiving a caller-specified priority for the call based on a caller input provided contemporaneously with the dialed number, wherein the priority is independent of a call recipient;
 generating the priority in response to at least a spoken input sound recognized by voice recognition logic;
 generating a priority indicator based on the priority; and
 transmitting the call setup request and priority indicator.

* * * * *